United States Patent
Zhu et al.

(10) Patent No.: US 11,038,870 B2
(45) Date of Patent: Jun. 15, 2021

(54) QUICK RESPONSE (QR) CODE FOR SECURE PROVISIONING

(71) Applicant: Microsoft Technology Licensing, LLC, Redmond, WA (US)

(72) Inventors: Liqiang Zhu, Bellevue, WA (US); Joel T. Hendrickson, Redmond, WA (US); Chang Chuen Kawaguchi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 15/454,836

(22) Filed: Mar. 9, 2017

(65) Prior Publication Data

US 2018/0262486 A1    Sep. 13, 2018

(51) Int. Cl.
*H04L 29/06* (2006.01)
*G06K 7/14* (2006.01)
(Continued)

(52) U.S. Cl.
CPC ........ *H04L 63/0823* (2013.01); *G06K 7/1417* (2013.01); *G06K 19/10* (2013.01); *H04L 63/062* (2013.01); *H04L 63/0838* (2013.01); *H04L 63/0853* (2013.01); *H04L 63/18* (2013.01); *H04W 12/04* (2013.01); *H04W 12/06* (2013.01); *H04W 12/35* (2021.01); *H04L 63/083* (2013.01); *H04L 2463/082* (2013.01); *H04W 12/77* (2021.01)

(58) Field of Classification Search
CPC ............... H04L 63/0823; H04L 63/062; H04L 63/0838; H04L 63/0853; H04L 63/18; H04L 63/083; H04L 2463/082; G06K 7/1417; G06K 19/10; H04W 12/04; H04W 12/06
USPC .......................................................... 726/6
See application file for complete search history.

(56) References Cited

U.S. PATENT DOCUMENTS 6,215,992 B1    4/2001  Howell et al.
8,002,175 B2    8/2011  Kuriyama et al.
(Continued)

FOREIGN PATENT DOCUMENTS

CN    102802155 A    11/2012
CN    102868696 A    1/2013
(Continued)

OTHER PUBLICATIONS

Kim, et al., "A Design of User Authentication System Using QR code Identifying Method", In Proceedings of 6th International Conference on Computer Sciences and Convergence Information Technology, Nov. 29, 2011, pp. 31-35.
(Continued)

*Primary Examiner* — Samson B Lemma
*Assistant Examiner* — Zoha Piyadehghibi Tafaghodi
(74) *Attorney, Agent, or Firm* — Christopher J. Volkmann; Kelly, Holt & Christenson, PLLC

(57) ABSTRACT

An input is received from a client device and is indicative of a desire to add a device for secure operations. Artifacts are generated and a quick response (QR) code is generated that represents the artifacts. The QR code is transmitted to the client device where it can be read by the device to be added, so the artifacts can be used in performing the secure operations.

20 Claims, 9 Drawing Sheets

(51) Int. Cl.
*G06K 19/10* (2006.01)
*H04W 12/04* (2021.01)
*H04W 12/06* (2021.01)
*H04W 12/30* (2021.01)
*H04W 12/77* (2021.01)

(56) References Cited

U.S. PATENT DOCUMENTS

| | | | |
|---|---|---|---|
| 8,256,664 | B1 | 9/2012 | Balfanz et al. |
| 8,405,729 | B2 | 3/2013 | Jain |
| 8,898,109 | B2 | 11/2014 | Neerincx et al. |
| 8,910,309 | B2 | 12/2014 | Harrison et al. |
| 9,107,056 | B2 | 8/2015 | Zerr et al. |
| 9,225,700 | B1 | 12/2015 | Dotan et al. |
| 9,265,079 | B2 | 2/2016 | Milligan et al. |
| 9,363,661 | B2 | 6/2016 | Chan et al. |
| 9,497,293 | B2 | 11/2016 | Somadder et al. |
| 9,668,289 | B2 | 5/2017 | Milligan et al. |
| 9,794,253 | B2 | 10/2017 | Narayan et al. |
| 9,807,070 | B2 | 10/2017 | Ren |
| 9,999,013 | B2 | 6/2018 | Cacioppo |
| 10,004,094 | B2 | 6/2018 | Milligan et al. |
| 10,257,341 | B2 | 4/2019 | Ivashyn |
| 10,362,614 | B2 | 7/2019 | Milligan et al. |
| 2010/0043056 | A1 | 2/2010 | Ganapathy |
| 2010/0153702 | A1 | 6/2010 | Loveless |
| 2010/0241857 | A1 | 9/2010 | Okude et al. |
| 2012/0188112 | A1 | 7/2012 | Beals et al. |
| 2012/0198531 | A1 | 8/2012 | Ort et al. |
| 2012/0199647 | A1 | 8/2012 | Hwang et al. |
| 2012/0240204 | A1 | 9/2012 | Bhatnagar et al. |
| 2013/0111208 | A1* | 5/2013 | Sabin ............... G06F 21/36 713/171 |
| 2013/0143651 | A1 | 6/2013 | Harrison et al. |
| 2013/0167208 | A1 | 6/2013 | Shi |
| 2013/0173915 | A1 | 7/2013 | Haulund |
| 2013/0193201 | A1* | 8/2013 | Bradley ............ G06F 17/30002 235/375 |
| 2013/0219479 | A1 | 8/2013 | DeSoto et al. |
| 2013/0262857 | A1 | 10/2013 | Neuman et al. |
| 2013/0276079 | A1 | 10/2013 | Foulds et al. |
| 2014/0032491 | A1 | 1/2014 | Neerincx et al. |
| 2014/0032964 | A1 | 1/2014 | Neerincx et al. |
| 2014/0067571 | A1* | 3/2014 | Fricke ............... G06Q 20/327 705/21 |
| 2014/0245396 | A1* | 8/2014 | Oberheide ........ H04W 12/0608 726/4 |
| 2014/0282923 | A1 | 9/2014 | Narayan et al. |
| 2014/0308922 | A1 | 10/2014 | Di et al. |
| 2015/0032578 | A1* | 1/2015 | Bicer ............... H04L 63/08 705/26.82 |
| 2015/0041530 | A1 | 2/2015 | Burkhart et al. |
| 2015/0245281 | A1 | 8/2015 | Beguin et al. |
| 2015/0264728 | A1 | 9/2015 | Milligan et al. |
| 2015/0317597 | A1 | 11/2015 | Shucker et al. |
| 2016/0065370 | A1* | 3/2016 | Le Saint ............ H04L 9/0841 713/155 |
| 2016/0099938 | A1* | 4/2016 | Seo ............... H04L 63/0853 713/169 |
| 2016/0180072 | A1 | 6/2016 | Ligatti et al. |
| 2016/0212126 | A1* | 7/2016 | Sadacharam ...... G06Q 20/3223 |
| 2016/0241402 | A1 | 8/2016 | Gordon et al. |
| 2016/0286393 | A1 | 9/2016 | Rasheed et al. |
| 2016/0294842 | A1 | 10/2016 | Ramalingam et al. |
| 2017/0012959 | A1* | 1/2017 | Sierra ............... H04L 63/083 |
| 2017/0061112 | A1* | 3/2017 | Bandyopadhyay ..... G06F 21/34 |
| 2017/0264608 | A1* | 9/2017 | Moore ............... H04L 63/0861 |
| 2018/0027078 | A1 | 1/2018 | Sinn et al. |
| 2019/0313470 | A1 | 10/2019 | Milligan et al. |

FOREIGN PATENT DOCUMENTS

| | | |
|---|---|---|
| CN | 102946628 A | 2/2013 |
| CN | 103338231 A | 10/2013 |
| CN | 103458012 A | 12/2013 |
| JP | 2006352286 A | 12/2006 |
| JP | 2008191929 A | 8/2008 |
| JP | 2009159188 A | 7/2009 |
| RU | 2446598 C2 | 3/2012 |
| WO | 2011126505 A1 | 10/2011 |
| WO | 2012146227 A1 | 10/2012 |
| WO | 2013061150 A1 | 5/2013 |
| WO | 2013151854 A1 | 10/2013 |
| WO | 2014036568 A1 | 3/2014 |

OTHER PUBLICATIONS

Harini, et al., "2CAuth: A New Two Factor Authentication Scheme Using QR-Code", In International Journal of Engineering and Technology, vol. 5, Issue 2, Apr. 2013, pp. 1087-1094.

Liao, et al., "A Novel User Authentication Scheme Based on QR-Code", In Journal of Networks, vol. 5, Issue 8, Aug. 2010, pp. 937-941.

Chang, et al., "Remote password authentication with smart cards", In IEE Proceedings of E-Computers and Digital Techniques, vol. 138, Issue 3, May 1991, pp. 165-168.

Sethi, et al., "Secure Bootstrapping of Cloud-Managed Ubiquitous Displays", In Proceedings of the 2014 ACM International Joint Conference on Pervasive and Ubiquitous Computing, Sep. 13, 2014, pp. 739-750.

"International Search Report and Written Opinion Issued in PCT Application No. PCT/US18/020347", dated May 17, 2018, 13 Pages.

"KinLogix EMR User Guide Mobile Application", Published by TELUS Health Solutions GP, Oct. 20, 2014, 22 Pages.

Constine, Josh, "How Snapchat Made QR Codes Cool Again", Retrieved From: https://techcrunch.com/2015/05/04/snapcode/, May 4, 2015, 12 Pages.

"Android Enterprise feature list", Retrieved from: https://developers.google.com/android/work/requirements, Retrieved on: Jul. 14, 2020, 2 pages.

"Taking the final wrapper off of Android 7.0 Nougat", Retrieved from:https://android-developers.googleblog.com/2016/08/taking-final-wrapper-off-of-nougat.html?utm_source=feedburner&utm_medium=feed&utm_campaign=Feed:+blogspot/hsDu+(Android+Developers+Blog), Retrieved on: Jul. 14, 2020, and bearing a date of Aug. 22, 2016, 3 pages.

"Google Announces the Release of Android 7.0 Nougat", Retrieved from: https://www.thurrott.com/mobile/android/77251/google-announces-release-android-7-0-nougat, Retrieved on: Jul. 14, 2020, and bearing a date of Aug. 22, 2016, 6 pages.

"Understanding Android API Levels", Accessed at: https://developer.xamarin.com/guides/android/application_fundamentals/understanding_android_api_levels/, accessed on Apr. 17, 2017, 5 pages. By submitting, Applicant does not affirm the accuracy of the contents therein.

"Android devices: enterprise use cases", Retrieved from: https://developers.google.com/android/work/overview, Retrieved on: Jul. 14, 2020, 4 pages.

"Device setup methods", Retrieved from: https://support.google.com/work/android/answer/9566881, Retrieved on: Jul. 14, 2020, 1 page.

"What is Android Enterprise?", Retrieved from: https://bayton.org/docs/enterprise-mobility/android/what-is-android-enterprise-and-why-is-it-used/, Retrieved on: Jul. 14, 2020, and bearing a date of Feb. 12, 2020, 10 pages.

"For Enterprise", Retrieved from: https://www.android.com/intl/en_in/enterprise/enrollment/, Retrieved on: Jul. 14, 2020, 10 pages.

"Set up and manage Android Management Experience", Retrieved from: https://support.google.com/work/android/answer/7168897?hl=en, Retrieved on: Jul. 14, 2020, 1 page.

"Enroll and provision a device", Retrieved from: https://developers.google.com/android/management/provision-device, Retrieved on: Jul. 14, 2020, 9 pages.

"Provision devices", Retrieved from: https://developers.google.com/android/work/play/emm-api/prov-devices#create_a_qr_code, Retrieved on: Jul. 14, 2020, 26 pages.

(56) References Cited

OTHER PUBLICATIONS

"Office Action Issued in European Patent Application No. 18713435.8", dated Sep. 16, 2020, 5 Pages.
Geel, et al., "PresiShare: Opportunistic Sharing and Presentation of Content Using Public Displays and QR Codes", In Proceedings of the 2nd ACM International Symposium on Pervasive Displays. Jun. 4, 2012, 6 pages.
Alhajry, Majed, "SuperBeam WiFi Direct Share", Published on: Dec. 4; 2013 Available at: https://play.google.com/store/apps/details?id=com.majedev.superbeam.
International Search Report and Written Opinion for International application No. PCT/US2015/019550, dated May 15, 2015, date of filing: Mar. 10, 2015, 9 pages.
"Second Written Opinion on International Preliminary Report Issued in PCT Patent Application No. PCT/US2015/019550"; dated Mar. 2, 2016, 6 Pages.
International Preliminary Report on Patentability for International Patent Application No. PCT/US2015/019550, dated Jul. 1, 2016, date of filing: Mar. 10, 2015, 7 pages.
Flanagan; "Pairing devices using QR-Codes", Retrieved from https://www.qrcode.es/en/pairing-devices-using-qr-codes/, Apr. 23, 2013, 6 pages.
Prosecution History for U.S. Appl. No. 16/406,436 including: Amendment filed Jun. 17, 2020 and Non-Final Office Action dated Mar. 23, 2020, 41 pages.
"Office Action Issued in European Patent Application No. 18713435.8", dated Mar. 29, 2021, 6 Pages.

\* cited by examiner

QUICK RESPONSE (QR) CODE FOR SECURE PROVISIONING

BACKGROUND

Computing systems are currently in wide use. Some computer systems host services which can be accessed by client devices at various tenants.

Such computing systems allow certain users, such as developers, engineers, etc., to perform actions only when they have been securely authenticated to the system. In order to do this, such computing systems often include some type of authentication service. The authentication service interacts with a user, through the client computing device (or a user's mobile device), to authenticate the user before allowing the user to take action that can only be taken by a user with the appropriate security assurances.

In such scenarios, it is common for a user to want to use multiple different devices in order to access the hosted computing system and to take secure actions. However, in order for a user to add a new device, this has often meant that a user must undergo a relatively time consuming and cumbersome process. For instance, such processes have normally meant that the authentication service sends a long password to the user, on an already enrolled device. The user is then tasked with retyping the long password into the device that the user wishes to add (or enroll). In doing so, it is not uncommon for a user to make errors in the password entry process, which can mean that the user must start the entire process over. If the user fails a threshold number of times, this can mean that the user is locked or precluded from further attempts without undergoing yet another relatively time consuming and cumbersome process.

The discussion above is merely provided for general background information and is not intended to be used as an aid in determining the scope of the claimed subject matter.

SUMMARY

An input is received from a client device and is indicative of a desire to add a device for secure operations. Artifacts are generated and a quick response (QR) code is generated that represents the artifacts. The QR code is transmitted to the client device where it can be read by the device to be added, so the artifacts can be used in performing the secure operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
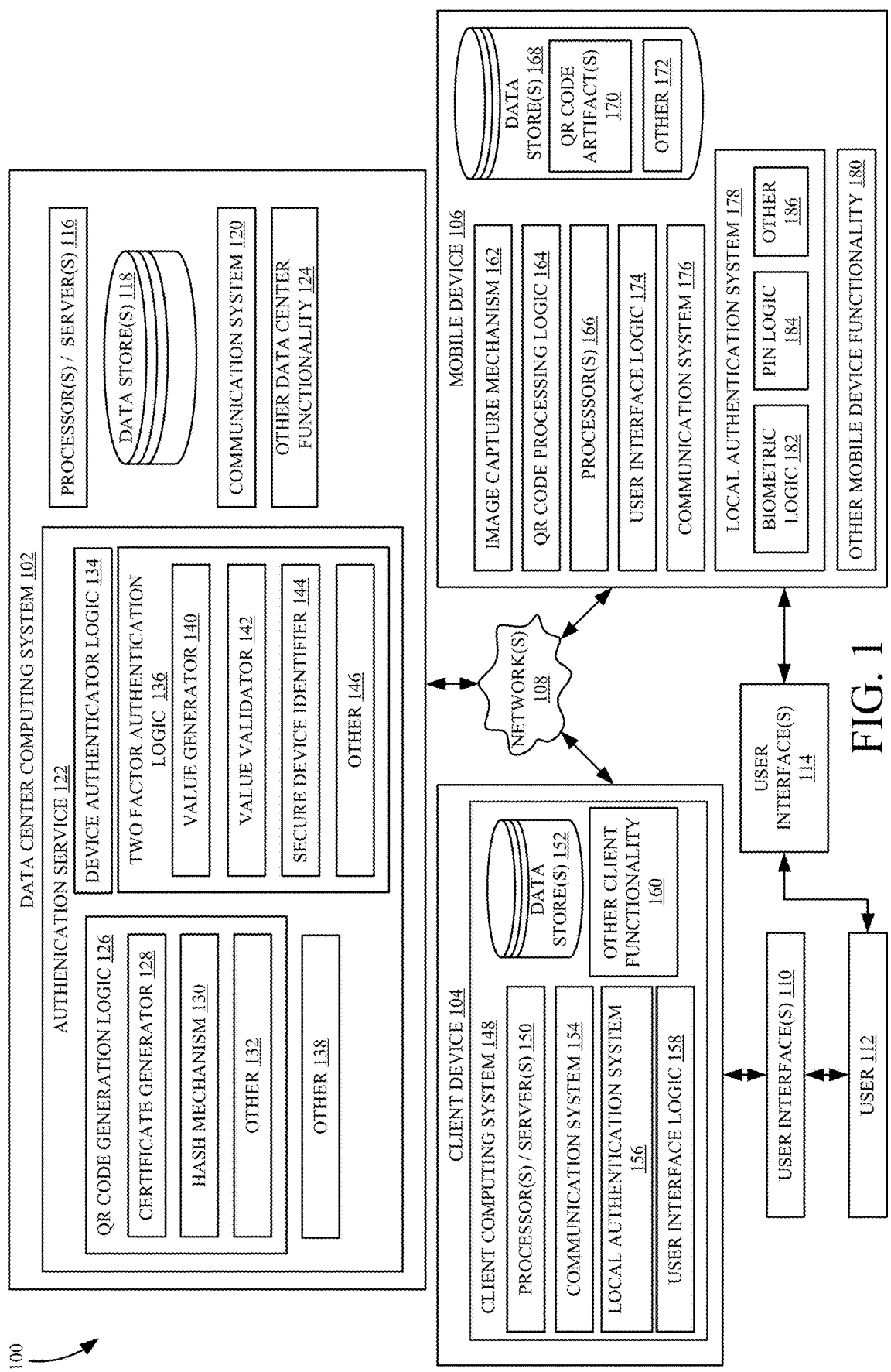
FIG. 1 is a block diagram of one example of a computing system environment.

FIG. 1 is a block diagram of one example of a computing system architecture 100. Architecture 100, in the example shown in FIG. 1 includes data center computing system 102, client device 104, and mobile device 106. Computing system 102, client device 104, and mobile device 106 can be communicatively coupled with one another over one or more networks 108. Networks 108 can include a wide area network, a local area network, a cellular network, a near field communication network, or a wide variety of other networks, or combinations of networks.

FIG. 1 also shows that, in one example, client device 104 generates one or more user interfaces 110 for interaction by user 112. The user interfaces 110 may illustratively include user input mechanisms that can be actuated by user 112 in order to control and manipulate client device 104 and some parts of data center computing system 102. Similarly, FIG. 1 shows that mobile device 106 illustratively generates one or more user interfaces 114, which may include user input mechanisms, for interaction by user 112. User 112 illustratively interacts with the user input mechanisms on user interfaces 114 in order to control and manipulate mobile device 106 and at least some portions of data center computing system 102.

Data center computing system 102 illustratively includes one or more networked computers and computer storage that various tenants (such as businesses or organizations) can use to store and process data. Data center 102 can include applications and services, as well as storage that tenants can use in accessing, processing and storing their data. Therefore, for instance, data center computing system 102 illustratively includes one or more processors or servers 116, one or more data stores 118, communication system 120, authentication service 122, and it can include a wide variety of other data center functionality 124, which can be used to run applications, perform services (such as hosted services or other services), perform data storage, organization and dissemination, among a wide variety of other things.

In the example shown in FIG. 1, authentication service 122 illustratively includes quick response (QR) code generation logic 126, which, itself, includes certificate generator 128, hash mechanism 130, and it can include other items 132. Authentication service 122 can also illustratively include device authenticator logic 134, two-factor authentication logic 136 and other items 138. In the example shown in FIG. 1, two-factor authentication logic 136 illustratively includes value generator 140, value validator 142, secure device identifier 144, and it can include other items 146.

Client device 104 can include a client computing system 148. Client computing system 148 can include one or more processors or servers 150, data store 152, communication system 154, local authentication system 156, user interface logic 158, and it can include a wide variety of other client functionality 160. Mobile device 106 illustratively includes image capture mechanism 162, QR code processing logic 164, one or more processors 166, data store 168 (which can include QR code artifacts 170 and a wide variety of other items 172), user interface logic 174, communication system 176, local authentication system 178, and it can include a wide variety of other mobile device functionality 180. Local authentication system 178, itself, can include biometric logic 182, personal identification number (PIN) logic 184, and it can include other items 186.

Before describing the overall operation of architecture 100 in more detail, a brief overview of some of the items in architecture 100, and their operation, will first be provided. Communication system 120 in data center computing system 102 can include one or more systems that may communicate with other data center computing systems, with one or more client devices 104, and with one or more mobile devices 106. Authentication service 122 illustratively allows a user 112 to add or enroll a new device (such as mobile device 106) so that user 112 can perform secure operations on data center computing system 102, using that device (e.g., mobile device 106). Local authentication system 156 on client computing system 148 illustratively allows user 112 to log into, and authenticate, himself or herself to client computing system 148. This may be done, for instance, using biometric information, using a personal identification number (PIN) or using other items. Communication system 154 illustratively allows client device 104 to communicate with data center computing system 102 and mobile device 106. User interface logic 158, either by itself, or under the control of another item, illustratively generates user interfaces 110 and detects user interaction with those interfaces.

Image capture mechanism 162, on mobile device 106, can include a camera, a QR code scanner or other hardware or software items that can be used to capture a QR code. QR code processing logic 164 illustratively processes the captured QR code image to identify QR code artifacts 170 and store them in data store 168. Logic 164 also illustratively adds those artifacts to messages sent from mobile device 106 to data center computing system 102, where those messages include requests to perform secure actions or operations. User interface logic 174 by itself, or under the control of another item, illustratively generates user interfaces 114, and detects user interaction with those interfaces. Communication system 176 can be a cellular communication system, or any other communication system or systems that allow mobile device 106 to communicate with data center computing system 102 and client device 104. Local authentication system 178 also illustratively includes biometric logic 182, and PIN logic 184 so that user 112 can authenticate himself or herself to mobile device 106 using biometric information or PIN information, etc.

As a brief description of the overall operation of architecture 100 in on-boarding (or enrolling) mobile device 106 for use in performing secure operations, user 112 illustratively first provides an input through client computing system 148 that is sent to authentication service 122, and that indicates that user 112 wishes to on-board a new device. By on-boarding, it is meant that the new device will be able to be used by user 112 in performing secure operations on data center computing system 102. In response to that request, QR code generation logic uses certificate generator 128 and hash mechanism 130 to generate artifacts that are represented in a QR code. The QR code is then sent back to client computing system 148 where it is illustratively displayed on a user interface 110. The user 112 then uses image capture mechanism 162 on mobile device 106 to capture the image of the QR code, and QR code processing logic 164 identifies the QR code artifacts 170 that were generated by QR code generation logic 126, and that are represented by the QR code. Later, when user 112 uses mobile device 106 to request a secure operation on data center computing system 102, user 112 first authenticates himself or herself to mobile device 106 using local authentication system 178 and then provides user inputs to generate the request to perform the secure operations. QR code processing logic 164 adds the QR code artifacts 170 to the request before it is sent to data center computing system 102. Device authenticator logic 134 identifies the QR code artifacts 170 in the request and authenticates mobile device 106 to data center computing system 102, so that the request to perform a secure operation can be executed by data center computing system 102.

The QR code artifacts can also be used to perform two-factor authentication. In order to do that, user 112 illustratively generates a request from client computing system 148 to perform an action for which two-factor authentication is needed. In that case, value generator 140 generates a two-factor authentication value and secure device identifier 144 identifies mobile device 106 as being securely enrolled for use by (and is correlated to) user 112. It can do this by accessing enrollment data that identifies enrolled devices and their corresponding users in data store 118. Logic 136 then sends the value to mobile device 106. User interface logic 174 displays that value so that user 112 can enter it into a user input mechanism on user interface 110 and send the value back to authentication service 122. Value validator 142 illustratively validates that the value entered by user 112 is in fact the value that was generated by value generator 140 and sent to mobile device 106 so that the two-factor authentication can be verified.

Figure 2:
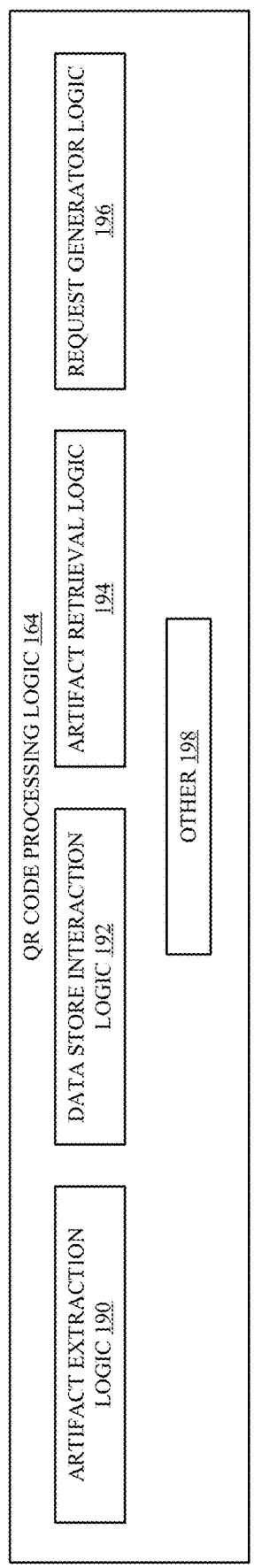
FIG. 2 is a block diagram showing one example of quick response (QR) code processing logic in more detail.

FIG. 2 is a more detailed block diagram showing one example of QR code processing logic 164. In the example shown in FIG. 2, logic 164 illustratively includes artifact extraction logic 190, data store interaction logic 192, artifact retrieval logic 194, request generator logic 196, and it can include a wide variety of other items 198. Artifact extraction logic 190 illustratively extracts the QR code artifacts 170 from the QR code once it is captured by image capture mechanism 162. Data store interaction logic 192 illustratively stores those QR code artifacts 170 in data store 168, and artifact retrieval logic 194 retrieves the QR code artifacts 170 when the user has generated a request to perform a secure action on data center computing system 102. Request generator logic 196 adds the QR code artifacts 170 to the request to perform the secure operation, before it is sent to data center computing system 102 using communication system 176 (shown in FIG. 1).

Figure 3:
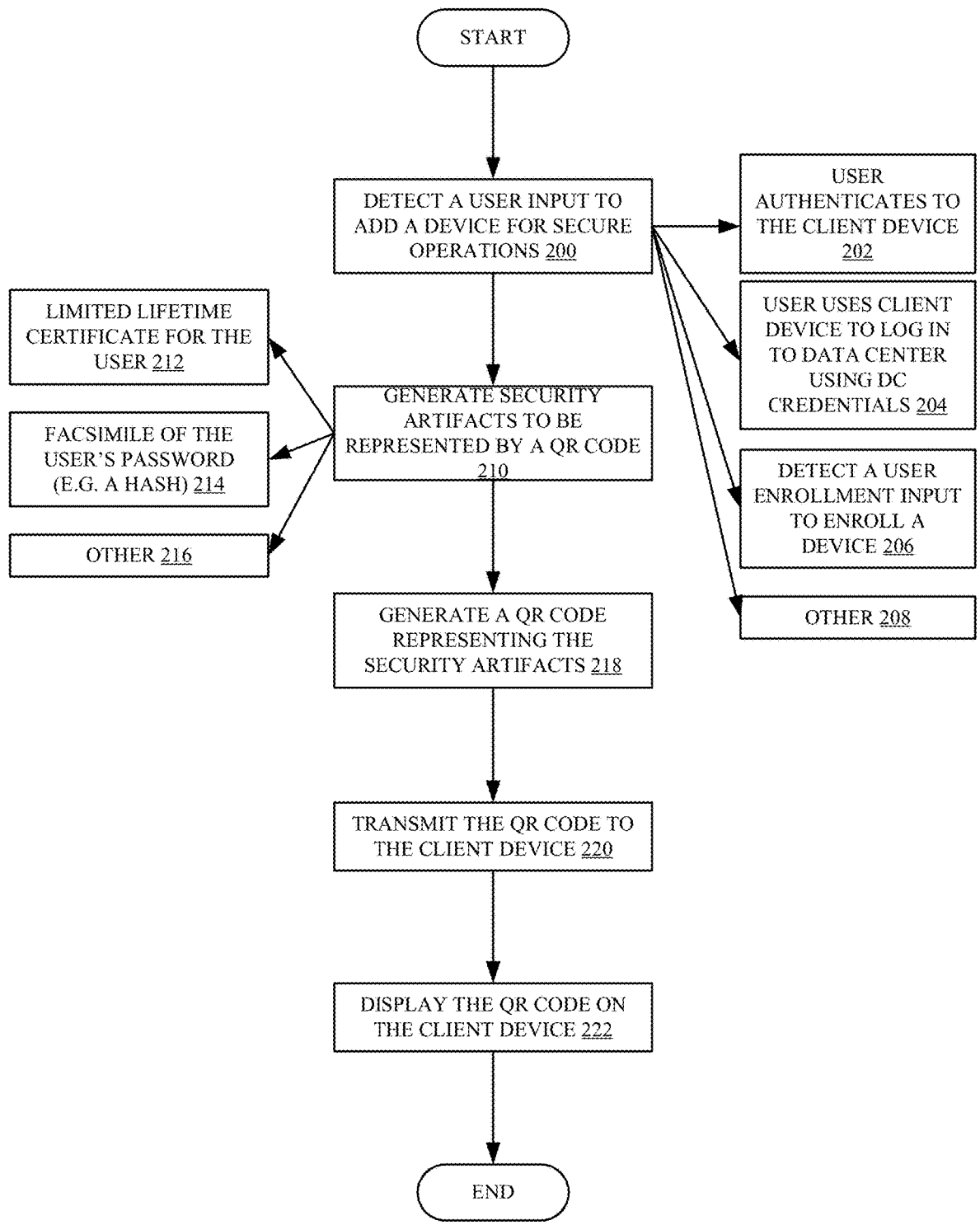
FIG. 3 is a flow diagram illustrating one example of the operation of the architecture shown in FIG. 1 in generating a QR code for display on a client device.

FIG. 3 is a flow diagram illustrating one example of the operation of the computing system architecture 100 in enrolling mobile device 106 to perform secure operations on data center computing system 102. Authentication service 122 first detects a user input to add a device (e.g., mobile device 106) for secure operations. This is indicated by block 200 in the flow diagram of FIG. 3. In one example, user 112 first authenticates himself or herself to client computing system 148 using local authentication system 156. This is indicated by block 202. This can be done, for instance, using biometric data, using PIN data, or in other ways. The user uses the client computing system 148 on client device 104 in order to log into data center 102, using the user's data center credentials. This is indicated by block 204. User 112 then provides an input through a user interface 110 and client computing system 148, to authentication service 122, indicating that user 112 wishes to enroll device 106 for performing secure operations. This is indicated by block 206.

Detecting a user input to add a device for secure operations can be done in other ways as well, and this is indicated by block 208.

QR code generation logic 126 then generates security artifacts to be represented by a QR code. This is indicated by block 210. For instance, in one example, certificate generator 128 generates a limited lifetime certificate for user 112, as one of the artifacts. This is indicated by block 212. QR code generation logic 126 also generates a facsimile of the user's password. This is indicated by block 214. For instance, in one example, hash mechanism 130 applies a hash algorithm to generate a hash value based on the user's password. Generating security artifacts represented by the QR code can be done in other ways as well, and this is indicated by block 216.

QR code generation logic 126 then generates a QR code representing the artifacts. This is indicated by block 218. In one example, for instance, QR code generation logic 126 can include a QR code generation algorithm that takes the artifacts as inputs and generates a QR code representing those artifacts. This can be done in other ways as well.

Authentication service 122 then uses communication system 120 to transmit the QR code to client device 104. This is indicated by block 220 in the flow diagram of FIG. 3. Communication system 154 on client computing system 148 then uses user interface logic 158 to display the QR code on a user interface 110, for user 112. This is indicated by block 222.

Figure 4:
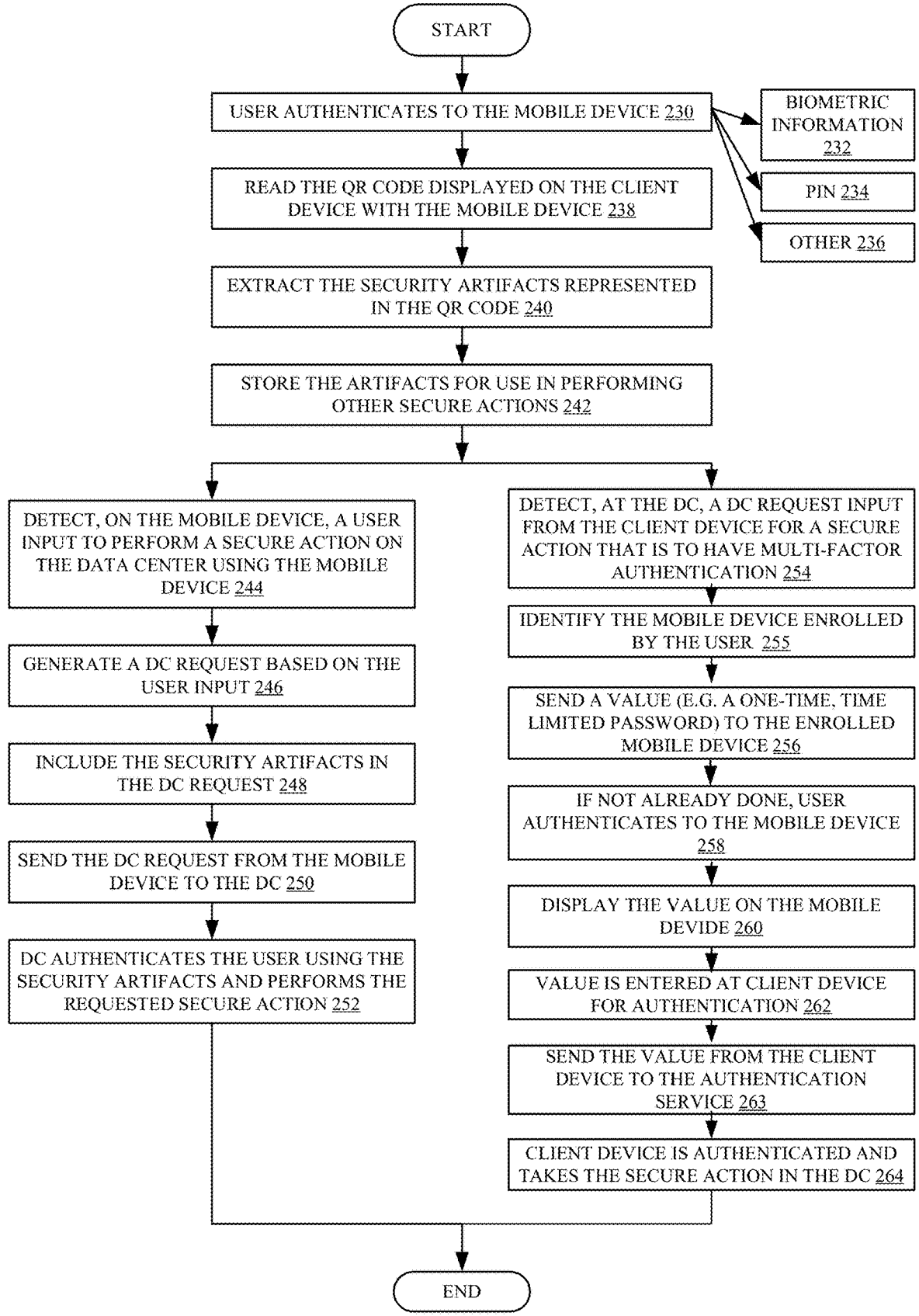
FIG. 4 is a flow diagram illustrating one example of the operation of the architecture shown in FIG. 1 in performing security operations with a mobile device that was enrolled using a QR code.

FIG. 4 is a flow diagram illustrating the operation of architecture 100 in finalizing the enrollment of mobile device 106, once the QR code has been sent to client device 104 and displayed on a user interface 110. FIG. 4 also illustrates the operation of architecture 100 in performing one or more different secure operations using mobile device 106, once it has been enrolled.

User 112 first authenticates himself or herself to mobile device 106, through one or more user interfaces 114, and using local authentication system 178. This is indicated by block 230 in the flow diagram of FIG. 4. Again, this can be done using biometric information 232, using PIN information 234, or in other ways 236. User 112 then operates mobile device 106 so that image capture mechanism 162 reads the QR code displayed on the client device 104. This is indicated by block 238 in the flow diagram of FIG. 4.

Artifact extraction logic 190, in QR code processing logic 164 on mobile device 106, then extracts the QR code security artifacts 170 that are represented in the QR code, and that were generated by QR code generation logic 126 (shown in FIG. 1). This is indicated by block 240 in the flow diagram of FIG. 4. Data store interaction logic 192 then interacts with data store 168 to store the QR code security artifacts 170 for later use in performing secure operations. This is indicated by block 242.

It is then assumed that user 112 wishes to use mobile device 106 to generate a request to perform a secure operation within data center computing system 102. User 112 thus provides an input on mobile device 106, through one or more user interfaces 114, to generate the request to perform a secure operation. This is indicated by block 244. Request generator logic 196 then generates a data center request, based upon those user inputs. This is indicated by block 246. Artifact retrieval logic 194 retrieves the QR code security artifacts 170 from data store 168, and provides them to request generator logic 196, so that the artifacts can be included with the data center request. This is indicated by block 248. Communication system 176 then sends the data center request, including the QR code security artifacts, from mobile device 106 to data center computing system 102. This is indicated by block 250. Device authenticator logic 134 receives the request and extracts the QR code security artifacts 170 and authenticates mobile device 106 as having been validly enrolled by user 112 to perform secure operations. It thus authorizes data center functionality 124 to perform the secure operations requested in the data center request, because mobile device 106 is properly authenticated. This is indicated by block 252.

In another secure operation, mobile device 106 is used to perform two-factor authentication when user 112 wishes to perform an operation on data center computing system 102 for which two-factor authentication is needed. Authentication service 122 first detects a data center request input from client device 104 for a secure action that is to have multi-factor authentication. In the present example, it will be assumed that the multi-factor authentication is two-factor authentication which is to be performed through mobile device 106. Detecting the data center request that requires multi-factor authentication is indicated block 254 in the flow diagram of FIG. 4. Secure device identifier 144 then identifies the secure device (as mobile device 106) that has been enrolled by user 112 to perform multi-factor authentication. This is indicated by block 255.

Value generator 140 then generates a value, to be sent to the enrolled mobile device using communication system 120. The value may be a wide variety of different types of values, such as a one-time, time limited password, or another value. This is indicated by block 256 in the flow diagram of FIG. 4.

If the user 112 has not already done so, user 112 authenticates himself or herself to mobile device 106, using local authentication system 178. This is indicated by block 258 in the flow diagram of FIG. 4. Once this happens, user interface logic 174 illustratively displays the value generated by value generator 140, on a user interface 114 of mobile device 106. This is indicated by block 260 in the flow diagram of FIG. 4. User 112 then enters the displayed value on a user interface 110 at client device 104, for authentication. This is indicated by block 262. The value is then sent by communication system 154 on client device 104 to value validator 142 in two-factor authentication logic 136 at data center computing system 102. This is indicated by block 263. Value validator 142 validates the value as being the same value generated by value generator 140 and uses this to authenticate the client device 104 to take the requested secure action at data center computing system 102. This is indicated by block 264 in the flow diagram of FIG. 4.

It can thus be seen that the present discussion provides a mechanism by which a new device can be enrolled for performing secure operations in a way that requires much less user involvement, and in a way that increases the accuracy of the entire enrollment process. This not only improves the computing system itself by increasing accuracy and reducing the number of round trips with the authentication service, but it also greatly enhances the user experience in performing such enrollment, without compromising security.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
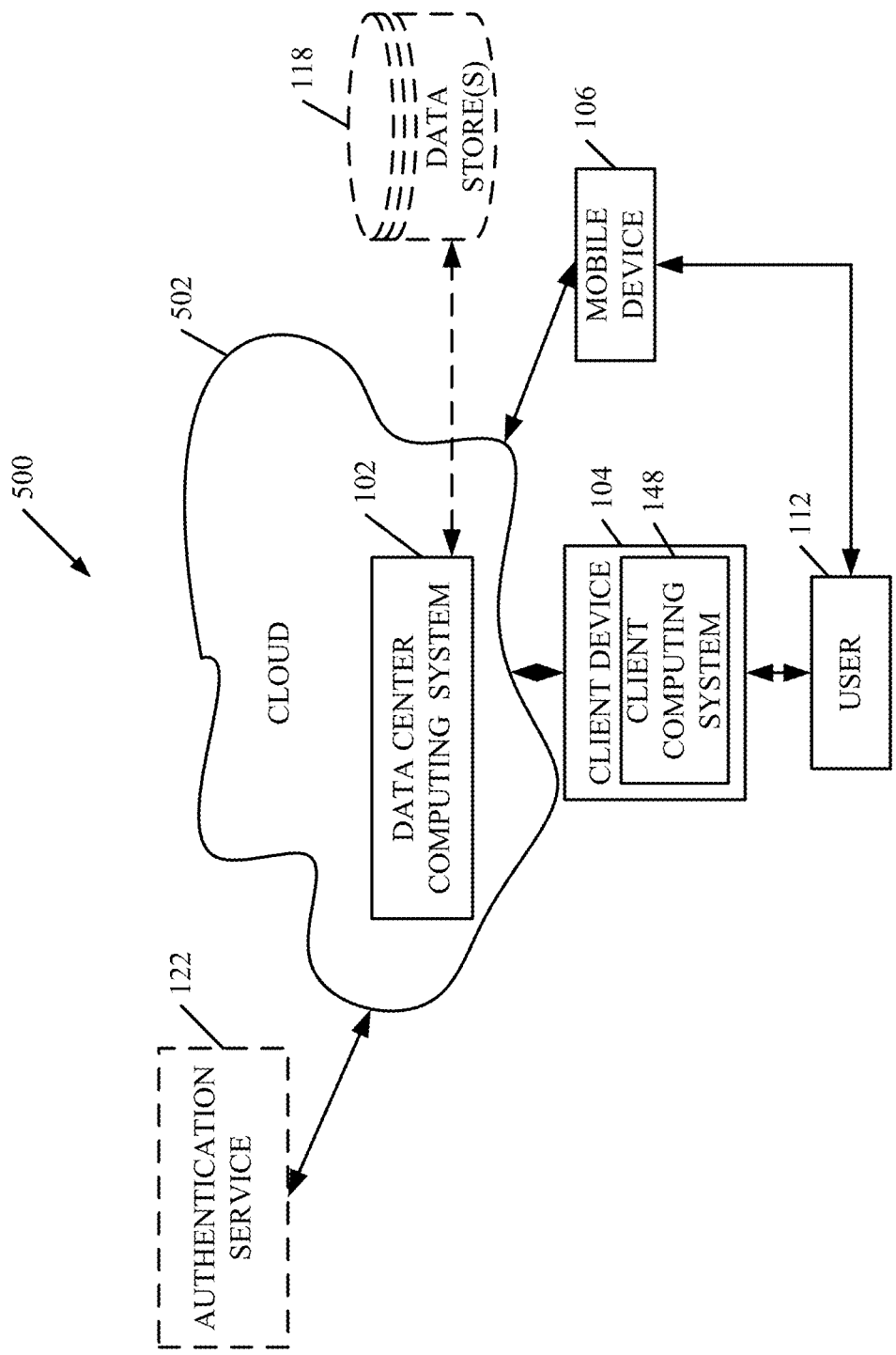
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that data center computing system 102 can be located in cloud 502 (which can be public, private, or a combination where portions are public while others are private). Therefore, user 112 uses a client device 104 and mobile device 106 to access those systems through cloud 502.

FIG. 5 also depicts another example of a cloud architecture. FIG. 5 shows that it is also contemplated that some elements of data center computing system 102 can be disposed in cloud 502 while others are not. By way of example, data store(s) 118 can be disposed outside of cloud 502, and accessed through cloud 502. In another example, authentication service 122 can be outside of cloud 502. Regardless of where they are located, they can be accessed directly by devices 104 and 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
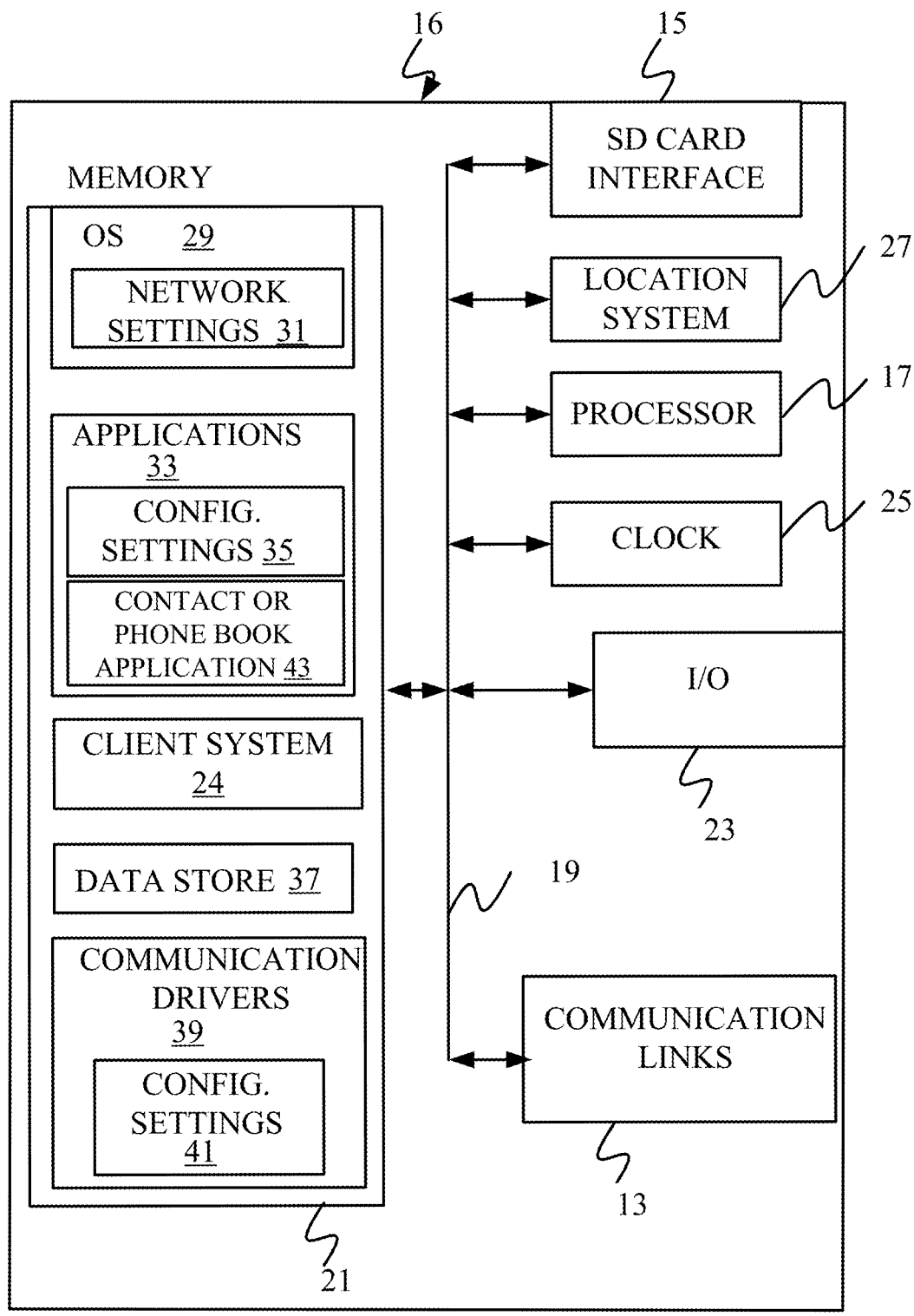
FIGS. 6-8 show examples of mobile devices that can be used in the architectures shown in the previous figures.
Figure 7:
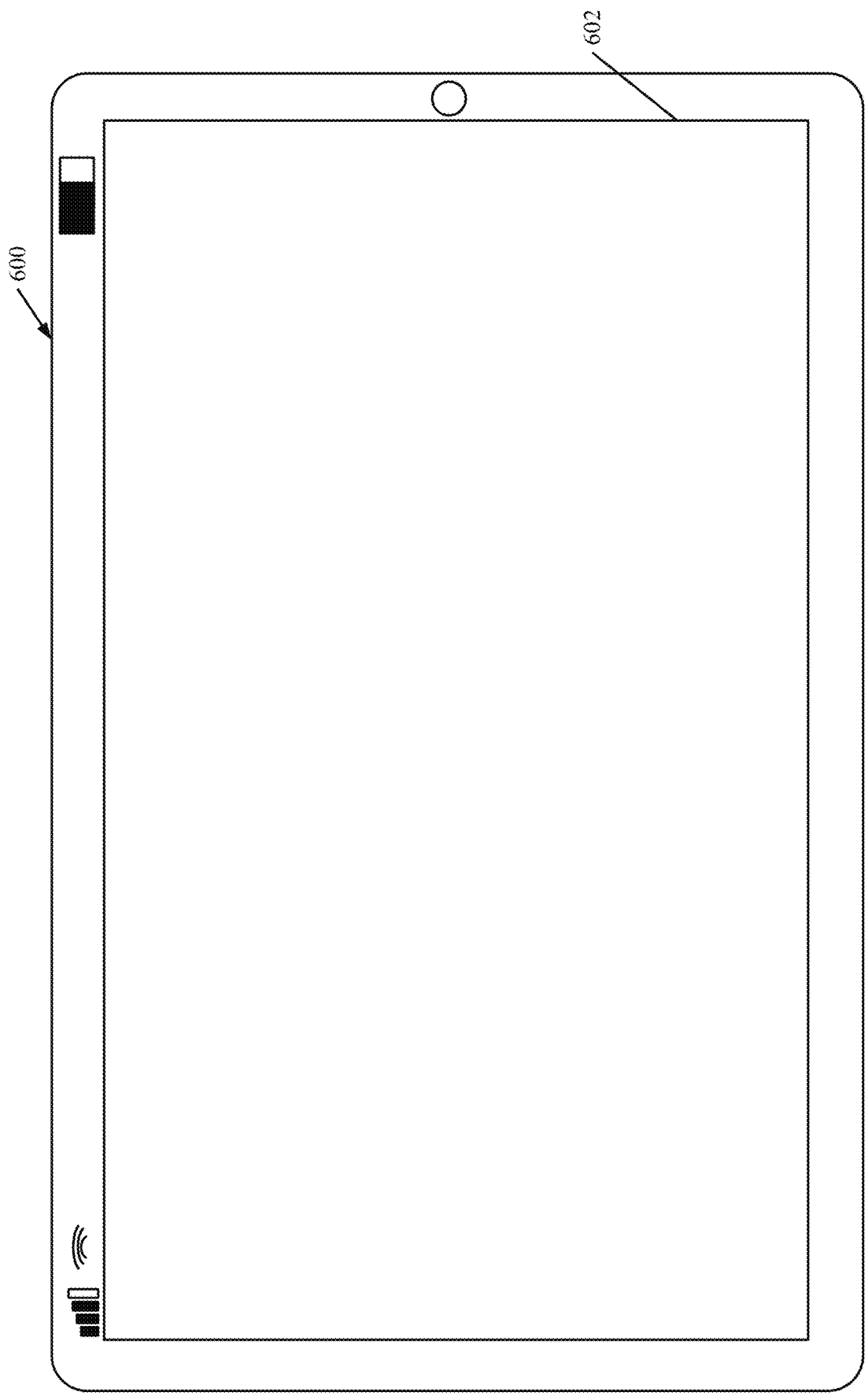
Figure 8:
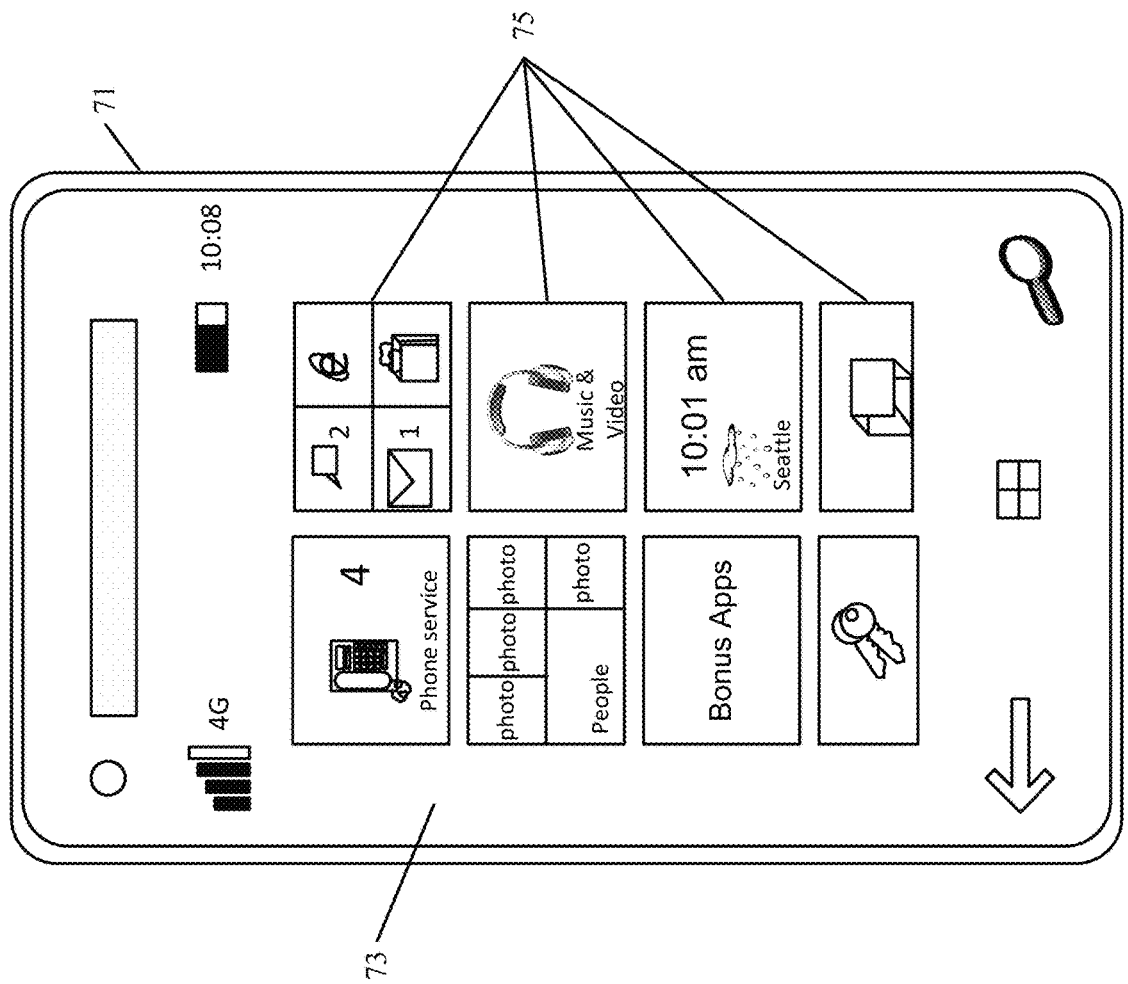

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of data center computing system 102, client device 104 and/or mobile device 106 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody any processors or servers in the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of client device 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
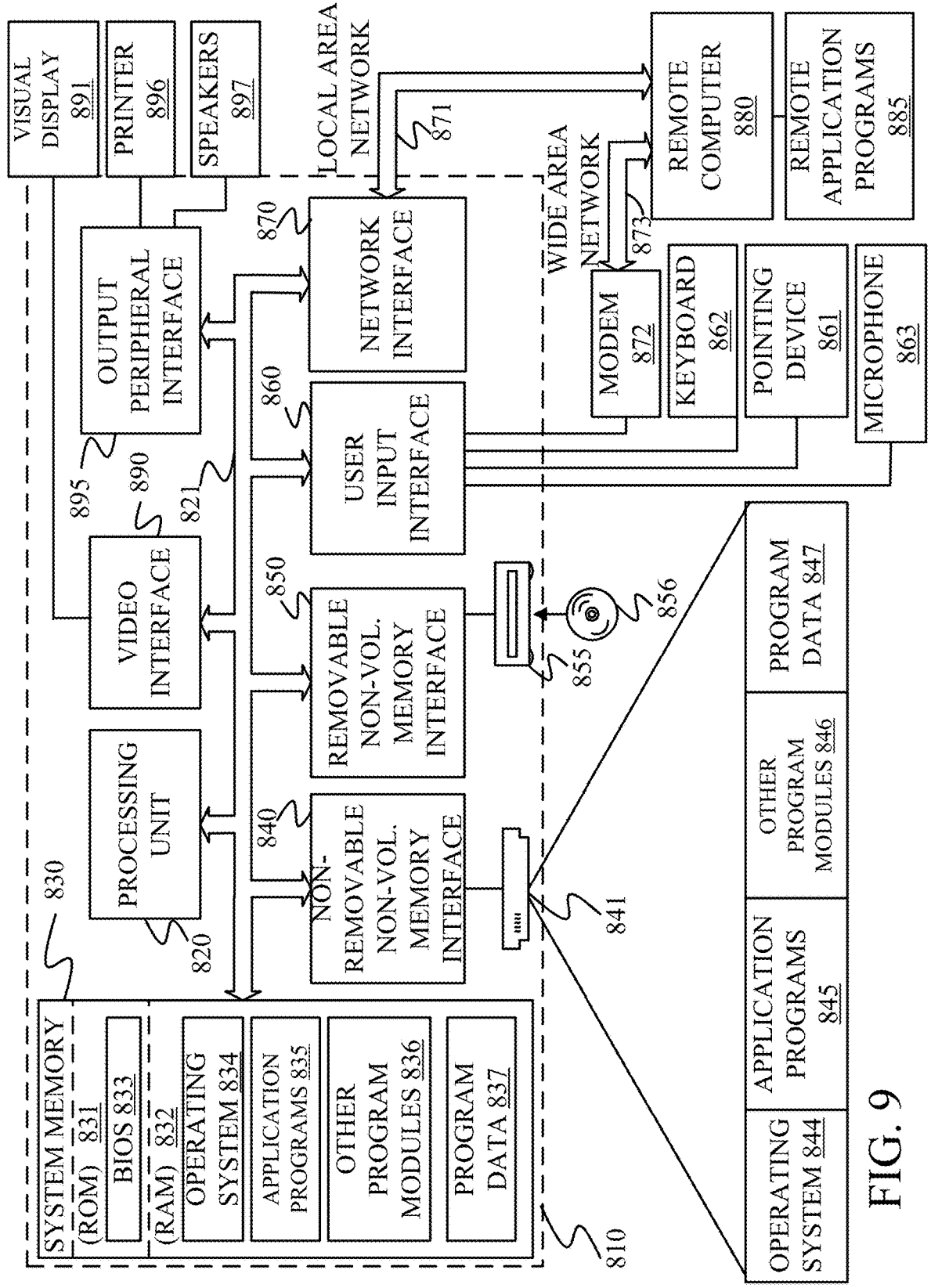
FIG. 9 is a block diagram showing one example of a computing environment that can be used in the architectures used in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

quick response (QR) code generation logic that receives an enrollment indication indicative of an enrollment request from a client computing system to enroll a user device for performance of a secure operation on the computing system and that generates a QR code representing an artifact;

a communication system that communicates the QR code to the client computing system; and device authenticator logic that detects a request to perform the secure operation from the user device, the request including the artifact, the device authenticator logic authenticating the user device for performance of the secure operation based on the artifact.

Example 2 is the computing system of any or all previous examples wherein the QR code generation logic comprises:

a password facsimile mechanism configured to generate a representation of a password for the user, as at least a part of the artifact.

Example 3 is the computing system of any or all previous examples wherein the password facsimile mechanism comprises:

a hash mechanism configured to generate a hash value, based on the password for the user, as the part of the artifact.

Example 4 is the computing system of any or all previous examples wherein the QR code generation logic comprises:

a certificate generator configured to generate a limited lifetime certificate for the user, as another part of the artifact.

Example 5 is the computing system of any or all previous examples and further comprising:

two factor authentication logic configured to send an authentication value to the user device in response to the computing system receiving a request from the client computing system for which two factor authentication is to be obtained.

Example 6 the computing system of any or all previous examples wherein the two factor authentication logic comprises:

a value generator configured to generate the authentication value and to use the communication system to send the authentication value to the user device.

Example 7 is the computing system of any or all previous examples wherein the two factor authentication logic comprises:

a secure device identifier configured to identify the user device as an enrolled device corresponding to the user of the client computing system.

Example 8 is the computing system of any or all previous examples wherein the two factor authentication logic comprises:

a value validator configured to receive a value from the client computing system and to validate that it is the authentication value generated by the value generator.

Example 9 is a computer implemented method, comprising:

receiving, at a computing system, an enrollment indication indicative of an enrollment request from a client computing system to enroll a user device for performance of a secure operation on the computing system;

generating a quick response (QR) code representing an artifact;

communicating the QR code to the client computing system;

detecting a request to perform the secure operation from the user device, the request including the artifact; and authenticating the user device for performance of the secure operation based on the artifact.

Example 10 is the computer implemented method of any or all previous examples, and further comprising:

performing the secure operation on the computing system based on the request.

Example 11 is the computer implemented method of any or all previous examples wherein generating a QR code comprises:

generating a representation of a password for the user, as at least a part of the artifact.

Example 12 is the computer implemented method of any or all previous examples wherein generating the representation of the password comprises:

generating a hash value, based on the password for the user, as the part of the artifact.

Example 13 is the computer implemented method of any or all previous examples wherein generating a QR code comprises:

generating a limited lifetime certificate for the user, as another part of the artifact.

Example 14 is the computer implemented method of any or all previous examples and further comprising:

receiving a request from the client computing system for which two factor authentication is to be obtained; and sending an authentication value to the user device in response to the computing system.

Example 15 is the computer implemented method of any or all previous examples wherein sending an authentication value comprises:

generating the authentication value; and using a communication system to send the authentication value to the user device.

Example 16 is the computer implemented method of any or all previous examples wherein sending the authentication value to the user device comprises:

identifying the user device as an enrolled device corresponding to the user of the client computing system.

Example 17 is the computer implemented method of any or all previous examples and further comprising:

receiving a value from the client computing system; and validating that the received value is the authentication value generated by the value generator.

Example 18 is a computing system, comprising:

quick response (QR) code generation logic that receives an enrollment indication indicative of an enrollment request from a client computing system to enroll a user device for performance of a secure operation on the computing system and that generates a QR code representing an artifact;

a communication system that communicates the QR code to the client computing system;

device authenticator logic that detects a request to perform the secure operation from the user device, the request including the artifact, the device authenticator logic authenticating the user device for performance of the secure operation based on the artifact; and computing system functionality logic that performs the secure operation based on authentication of the user device.

Example 19 is the computing system of any or all previous examples wherein the QR code generation logic comprises:

a hash mechanism configured to generate a hash value, based on a password for the user, as the part of the artifact; and a certificate generator configured to generate a limited lifetime certificate for the user, as another part of the artifact.

Example 20 is the computing system of any or all previous examples and further comprising:

a value generator configured to generate an authentication value;

a secure device identifier configured to identify the user device as an enrolled device corresponding to the user of the client computing system, and to use the communication system to send the authentication value to the user device; and a value validator configured to receive a value from the client computing system and to validate that the received value is the authentication value generated by the value generator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, cause the computing system to:
receive an enrollment request, corresponding to a user, from a first client computing device that requests new device enrollment of a second client computing device to perform a secure operation on the computing system;
obtain a password associated with the user;
in response to the enrollment request and based on authenticating the first client computing device, generate a QR code including an artifact that represents the password;
communicate the QR code including the artifact that represents the password to the first client computing device;
detect a request to perform the secure operation from the second client computing device, the request indicating the second client computing device scanned the QR code displayed on the first client computing device and including the artifact that represents the password obtained from the QR code;

based on the request including the artifact, generate enrollment data that identifies the second client computing device as an enrolled device and authenticates the second client computing device for performance of the secure operation; and perform, with the second client computing device, the secure operation based on the enrollment data.

2. The computing system of claim 1 wherein the representation of the password comprises a hash value, based on the password for the user.

3. The computing system of claim 1 wherein the instructions cause the computing system generate a limited lifetime certificate for the user, as a part of the artifact.

4. The computing system of claim 1 wherein the instructions cause the computing system to:

send an authentication value to the second client computing device in response to the computing system receiving a request from the first client computing device for which two factor authentication is to be obtained.

5. The computing system of claim 4 wherein the instructions cause the computing system to:

generate the authentication value and to use the communication system to send the authentication value to the second client computing device.

6. The computing system of claim 5 wherein the instructions cause the computing system to:

identify the second client computing device as an enrolled device corresponding to the user of the first client computing device; and receive a value from the first client computing device and to validate that the received value corresponds to it is the authentication value generated by the value generator.

7. The computing system of claim 1, wherein the computing system comprises a server computing system that communicates with the first and second client computing devices over a communication network.

8. The computing system of claim 1, wherein the computing system comprises a data center computing system that is remote from the first and second client computing devices.

9. A computer implemented method, comprising:

receiving, at a computing system, an enrollment request from a first client computing device that requests new device enrollment of a second client computing device on the computing system;

in response to the enrollment request and based on authenticating the first client computing device, generating a quick response (QR) code representing an artifact;

communicating the QR code to the first client computing device;

detecting a first request from the second client computing device, the first request including the artifact and indicating the second client computing device scanned the QR code displayed on the first client computing device; and based on the first request including the artifact, authenticating the second client computing device and generating enrollment data that identifies the second client computing device as an enrolled device;

receiving a second request from the first client computing device to perform an operation on the computing system for which two-factor authentication is to be obtained;

sending an authentication value to the second client computing device in response to the second request from the first client computing device and based on the enrollment data that identifies the second client computing device as an enrolled device;

determining that a value, received from the first client computing device, corresponds to the authentication value; and performing the operation based on the determination.

10. The computer implemented method of claim 9, wherein the computing system comprises a server computing system that communicates with the first and second client computing devices over a communication network.

11. The computer implemented method of claim 9, wherein the computing system comprises a data center computing system that is remote from the first and second client computing devices.

12. The computer implemented method of claim 9 wherein generating a QR code comprises:

generating a representation of a password for the user, as at least a part of the artifact.

13. The computer implemented method of claim 12 wherein generating the representation of the password comprises:

generating a hash value, based on the password for the user, as the part of the artifact.

14. The computer implemented method of claim 12 wherein generating a QR code comprises:

generating a limited lifetime certificate for the user, as another part of the artifact.

15. The computer implemented method of claim 9 wherein sending an authentication value comprises:

generating the authentication value; and using a communication system to send the authentication value to the second client computing device.

16. A method performed by a computing system, the method comprising:

receiving an enrollment request, corresponding to a user, from a first client computing device that requests new device enrollment of a second client computing device to perform a secure operation on the computing system;

obtaining a password associated with the user;

in response to the enrollment request and based on authenticating the first client computing device, generating a QR code that includes an artifact representing the password;

communicating the QR code including the artifact that represents the password to the first client computing device;

detecting a request to perform the secure operation from the second client computing device, the request indicating the second client computing device scanned the QR code displayed on the first client computing device and including the artifact that represents the password obtained from the QR code;

based on the request including the artifact, generating enrollment data that identifies the second client computing device as an enrolled device and authenticating the second client computing device for performance of the secure operation; and performing the secure operation with the second client computing device based on the enrollment data.

17. The method of claim 16, wherein the computing system comprises a server computing system that communicates with the first and second client computing devices over a communication network.

18. The method of claim 16, wherein the computing system comprises a data center computing system that is remote from the first and second client computing devices.

19. The method of claim 16, and further comprising:
generating a hash value, based on the password for the user, as the part of the artifact; and
generating a limited lifetime certificate for the user, as another part of the artifact.

20. The method of claim 19, and further comprising:
generating an authentication value;
identifying the second client computing device as an enrolled device corresponding to the user of the first client computing system;
using a communication system to send the authentication value to the second client computing device; and
receiving a value from the first client computing system and validating that the received value is the authentication value.

* * * * *